(12) United States Patent
Shin et al.

(10) Patent No.: US 9,711,177 B1
(45) Date of Patent: Jul. 18, 2017

(54) FORWARD CORRUPTED TRACK DETECTION AND BY-PASS FOR SHINGLED MAGNETIC RECORDING DRIVES

(71) Applicant: SEAGATE TECHNOLOGY LLC, Cupertino, CA (US)

(72) Inventors: Junghwan Shin, Gyeonggi-do (KR); Jae Ik Song, Gyeonggi-do (KR); Dong Hyuck Shin, Gyeonggi-do (KR); Eun Yeong Hong, Gyeonggi-do (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/170,762

(22) Filed: Jun. 1, 2016

(51) Int. Cl.
  *G11B 27/36* (2006.01)
  *G11B 5/09* (2006.01)
  *G11B 20/18* (2006.01)

(52) U.S. Cl.
  CPC .... *G11B 20/1816* (2013.01); *G11B 2020/183* (2013.01); *G11B 2020/1823* (2013.01)

(58) Field of Classification Search
  CPC ........... G11B 5/012; G11B 27/36; G11B 5/02; G11B 20/18; G11B 20/1803; G11B 20/16; G11B 2220/90
  USPC .................. 360/25, 31, 53, 72.1, 47
  See application file for complete search history.

(56) References Cited

U.S. PATENT DOCUMENTS

2015/0254144 A1* 9/2015 Pantel ................ G11B 20/1252
  360/48

* cited by examiner

*Primary Examiner* — Nabil Hindi
(74) *Attorney, Agent, or Firm* — Holland & Hart LLP

(57) ABSTRACT

Systems and methods for forward corrupted track detection and by-pass are described. In one embodiment, a storage system comprising a storage controller performs a read operation for a target track of a shingled magnetic recording (SMR) disk drive and detects a read operation failure of the read operation for the target track. The storage controller also performs a boundary track read operation on one or more tracks including or adjacent to the target track and detect a forward corruption area based on the boundary track read operation. In another embodiment, a method is provided that includes detecting a read operation failure of a read operation for a track of a disk drive and performing a boundary track read operation on one or more tracks including or adjacent to the target track. The method also includes detecting a forward corruption area based on the boundary track read operation.

20 Claims, 7 Drawing Sheets

FORWARD CORRUPTED TRACK DETECTION AND BY-PASS FOR SHINGLED MAGNETIC RECORDING DRIVES

SUMMARY

The present disclosure is directed to methods and systems for detecting a forward corrupted track in a disc drive and by-passing the corrupted sectors. In some embodiments, the present systems and methods may improve drive performance by detecting a forward corrupted track that can occur due to the characteristics a writing operation in a shingled magnetic recording (SMR) drive.

A storage system for forward corrupted track detection and by-pass is described. In one embodiment, the storage system may include a storage controller to perform a read operation for a target track of a SMR disk drive. The storage controller may further detect a read operation failure of the read operation for the target track and perform a boundary track read operation on one or more tracks including or adjacent to the target track. The storage controller may also detect a forward corruption area based on the boundary track read operation.

In some examples, the storage controller may further perform the boundary track read operation by sampling one or more sectors near the target track to identify an extent of the forward corruption area. The storage controller may further perform a read operation for each of the one or more sectors near a failed sector of the target track where the read failure occurred and perform a read operation for one or more sectors in a next track with respect to the target track. The storage controller may further determine a status of the read operations for each of the one or more sectors. In some examples, the storage controller may further identify the forward corruption area from a first sector of the one or more sectors having a read failure to a last sector of the one or more sectors having a read failure.

In another example, the storage controller may further detect the read operation failure at a failed sector of the target track, determine a location of the failed sector within the target track, and select the one or more tracks to perform the boundary read operation based at least in part on the location of the failed sector.

Some examples of the storage system may include the storage controller retrying the read operation at a failed sector in the target track where the read operation failed. If the retried read operation at the failed sector fails again, the storage controller is to perform a read operation on each of a first sector that is two sectors before the failed sector and a second sector that is two sectors after the failed sector.

The storage controller may further identify one or more sectors of the forward corruption area as bad sectors and store an indication in a table that identifies the one or more sectors of the forward corruption area as bad sectors. Upon receiving a read command, the storage controller may check the table to determine whether any sector included in the read command is listed as a bad sector. If any sector included in the read command is listed as a bad sector, the storage controller does not perform the read command and if no sector included in the read command is listed as a bad sector, the storage controller performs the read command.

A method for forward corrupted track detection and by-pass is also described. In one embodiment, the method may include detecting a read operation failure of a read operation for the track of a disk drive. The method may also include performing a boundary track read operation on one or more tracks including or adjacent to the target track and detecting a forward corruption area based on the boundary track read operation.

An apparatus for forward corrupted track detection and by-pass is also described. In one embodiment, the apparatus may include a storage drive configured for incorporation into a data center or data cloud environment and a controller to perform the steps of detecting a read operation failure of a read operation for a target track of the storage drive and performing a boundary track read operation on one or more tracks including or adjacent to the target track. The controller may further perform the step of detecting a forward corruption area based on the boundary track read operation.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following figures. In the appended figures, similar components or features may have the same reference label. Further, various components of the same type may be distinguished by following a first reference label with a dash and a second label that may distinguish among the similar components. However, features discussed for various components—including those having a dash and a second reference label—may apply to other similar components. If only the first reference label is used in the specification, the description is applicable to any one of the similar components having the same first reference label irrespective of the second reference label.

DETAILED DESCRIPTION

Figure 1:
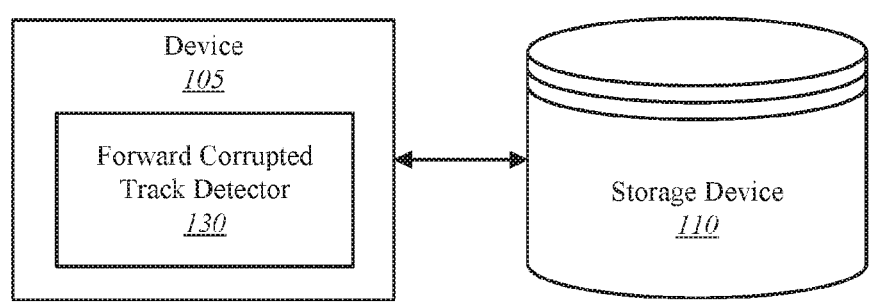
FIG. 1 is a block diagram of an example of a system in accordance with various embodiments.

The following relates generally to detection of forward corrupted tracks and by-pass of the corrupted tracks, particularly in shingled magnetic recording (SMR) drives. An SMR drive is a storage device that uses bands of overlapping tracks to increase storage density. SMR techniques may be used to write a new track that partially overlaps a previously written track, creating a shingled aspect to the tracks. The SMR technique leverages the fact that a width of a read head is typically narrower than a width of a write head. The storage density of an SMR drive is increased over conventional drives because the previously written tracks are thinner, thus allowing for higher track density. An SMR drive may contain a set of bands of overlapping tracks. The bands may be separated by an isolation space, which serves to reduce the number of tracks that need to be rewritten when a shingled track is rewritten.

However, writing to a track may cause some adjacent tracks to need rewriting because data in the adjacent tracks may be overwritten or deleted due to the wider write head. This is due to a characteristic of SMR drives in which the tracks per inch (TPI) is brought to a limit of what data the read head is able to read. In SMR drives, if the power of the drive is interrupted (e.g., turned off, lost, etc.) during a write operation, the very next track in the direction of the writing operation may likely be corrupted. Without a mechanism to record location information of the interrupted writing operation, the corrupted area may not be immediately detected. When the corrupted area is later read, the read operation may fail (referred to herein as a read fail). Following a read operation failure, the drive may take a long time to perform a retry of the read operation. The corrupted areas are due to forward corruption. This degrades the drive performance.

Techniques described herein provide methods, drives, and systems that reduce the degradation of the drive performance when the drive has corrupted tracks. The techniques include detecting a forward corrupted track when a read head encounters the forward corrupted area during a read operation in the drive. The techniques enable detection of the corrupted tracks even when there is no record of the position of an interrupted write operation (e.g., the position of the last writing of data before a power-off).

As described herein, boundary track read operations may be used to detect and process a forward corrupted track. A boundary track read operation is a read operation performed at the boundary (e.g., edge) of a track. Boundary track read operations may be performed when a read operation fails for a target track. Some sectors of the drive may be sampled in the target track after the read operation fails. The sectors may be in the target track or in adjacent tracks. The techniques may take track skew into account. Track skew is a rotational offset from the previous sector on one track to a first sector of the next track. Track skew allows a seek to complete during the rotational time, without performing another revolution, so as to improve sequential throughput.

Particular sectors and adjacent sectors are sampled in order to determine whether the error is due to forward corruption. A target track is a track where the read operation is directed, and is referred to herein as an "N track." A track adjacent before the target track is referred to herein as "N−1 track" and a track adjacent after the target track is referred to herein as "N+1 track." Some sectors to be sampled include the sector where the forward corruption started, the last sector of the track where the forward corruption started (N track), the first sector of the next track after the track where the forward corruption started (N+1 track), the sectors of the N+1 track at the same wedge of the first sector where the forward corruption started, the sectors of the N+1 track at the same wedge of the last sector of the track where the forward corruption started, and the last sector of the N+1 track and/or sectors nearby those sectors described. In other examples, other sectors and subsets of the above-listed sectors may be sampled.

Based on the location of the first read fail, forward corruption with track skew can be categorized into at least three types. A track with forward corruption can be determined by comparing retry results at each position with expected values based on the type of forward corruption. For each type, the sample sectors, the expected values, and the area to be determined as forward corrupted may be defined. Three possible categories may include a normal case, within a track skew range case, and a full track case. The different categories may have different sectors sampled and different outcomes for those sectors defined.

Techniques described herein may perform a process when a read fail is determined to be due to a forward corrupted track. The sectors within the corrupted area may be identified as bad sectors. For example, a table can be created or updated that identifies the bad sectors. A drive controller may consult this table when receiving or ordering a read operation. The drive controller may not perform a read operation for the bad sectors until new data is written to those sectors. The table may be updated to remove the bad sectors once new data is written to the bad sectors. In another example, the drive controller may fill the identified bad sectors with zero data. In this case, the bad sectors may be available for normal use.

These techniques improve drive performance by reducing the chance that a read operation will fail due to a forward corrupted track. Further, the techniques may make the drive available for normal use.

FIG. 1 is a block diagram illustrating one embodiment of an environment 100 in which the present systems and methods may be implemented. The environment 100 may include device 105 and storage device 110. The storage device 110 may include any combination of hard disk drives, solid state drives, and hybrid drives, or combinations thereof, that include both hard disk and solid state drives. The storage device 110 may include one or more drives, which may be SMR drives, two dimensional magnetic recording (TDMR), multi-sensor magnetic recording (MSMR), and/or another type of magnetic hard drive. In some embodiments, the systems and methods described herein may be performed on a single device (e.g., device 105). In some cases, the techniques described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, or any combination thereof. In some configurations, the device 105 may include a forward corrupted track detector 130. In one example, the device 105 may be coupled to the storage device 110. In some embodiments, the device 105 and the storage device 110 may be components of flash memory or solid state drive. Alternatively, the device 105 may be a component of a host (e.g., operating system, host hardware system, etc.) of the storage device 110.

In one embodiment, the device 105 may be a computing device with one or more processors, memory, and/or one or more storage devices. In some cases, the device 105 may include a wireless storage device. In some embodiments, the device 105 may include a cloud drive for a home or office setting. In one embodiment, the device 105 may include a network device such as a switch, router, access point, or any combination thereof. In one example, the device 105 may be operable to receive data streams, store and/or process data, and/or transmit data from, to, or in conjunction with one or more local and/or remote computing devices.

The device 105 may include a database. In some cases, the database may be internal to the device 105. For example, the storage device 110 may include a database. Additionally, or alternatively, the database may include a connection to a wired and/or a wireless database. Additionally, as described in further detail herein, software and/or firmware (e.g., stored in memory) may be executed on a processor of the device 105. Such software and/or firmware executed on the processor may be operable to cause the device 105 to monitor, process, summarize, present, and/or send a signal associated with the operations described herein.

In some embodiments, the storage device 110 may connect to the device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), etc. In some configurations, the network may include the Internet and/or an intranet. The device 105 may receive and/or send signals over a network via a wireless communication link. In some embodiments, a user may access the functions of the device 105 via a local computing device, remote computing device, and/or network device, or any combination thereof. For example, in some embodiments, the device 105 may include an application that interfaces with a user. In some cases, the device 105 may include an application that interfaces with one or more functions of a network device, remote computing device, and/or local computing device, or any combination thereof.

In one embodiment, the storage device 110 may be internal to the device 105. As one example, the device 105 may include a storage controller that interfaces with storage media of the storage device 110. The forward corrupted track detector 130 may identify a forward corrupted track and perform a by-pass for the corrupted track. The by-pass may mitigate the corrupted track.

Figure 2:
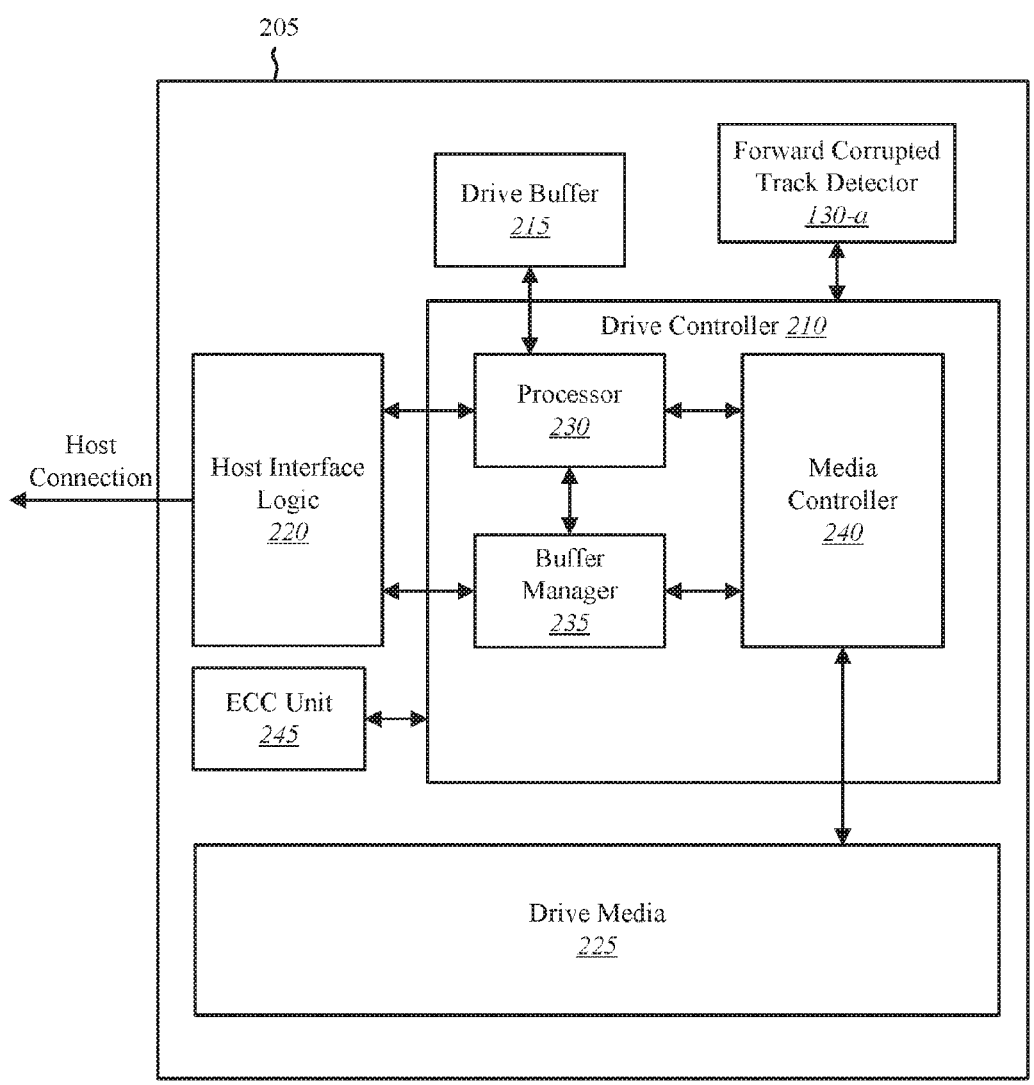
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of the device 105 described with reference to FIG. 1. The apparatus 205 may include a drive controller 210, a drive buffer 215, a host interface logic 220, a drive media 225, and a forward corrupted track detector 130-a. The forward corrupted track detector 130-a may be an example of one or more aspects of the forward corrupted track detector 130 described with reference to FIG. 1. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via the processor 230, read and write requests in conjunction with the host interface logic 220, which acts as an interface between the apparatus 205 and a host of apparatus 205 (e.g., an operating system, host hardware system, etc.). The drive buffer 215 may hold data temporarily for internal operations of the apparatus 205. For example, a host may send data to the apparatus 205 with a request to store the data on the drive media 225. The drive controller 210 may process the request and cause the drive media 225 to store the received data. In some cases, a portion of data stored in the drive media 225 may be copied to the drive buffer 215 and the processor 230 may process or modify this copy of data and/or perform an operation in relation to this copy of data held temporarily in the drive buffer 215.

Although depicted outside of the drive controller 210, in some embodiments, the forward corrupted track detector 130-a may include software, firmware, and/or hardware located within the drive controller 210. For example, the forward corrupted track detector 130-a may include at least portions of the processor 230, the buffer manager 235, and/or the media controller 240. In one example, the forward corrupted track detector 130-a may include one or more instructions executed by the processor 230, the buffer manager 235, and/or the media controller 240. The forward corrupted track detector 130-a may be configured to sample sectors near a detected forward corrupted track in order to determine the extent of corruption. The forward corrupted track detector 130-a may sample specific sectors based on where the forward corrupted track is located within a track and whether it is within a track skew range. The forward corrupted track detector 130-a may store the extent of the corruption in a table or may rewrite the data in the corrupted area.

Figure 3:
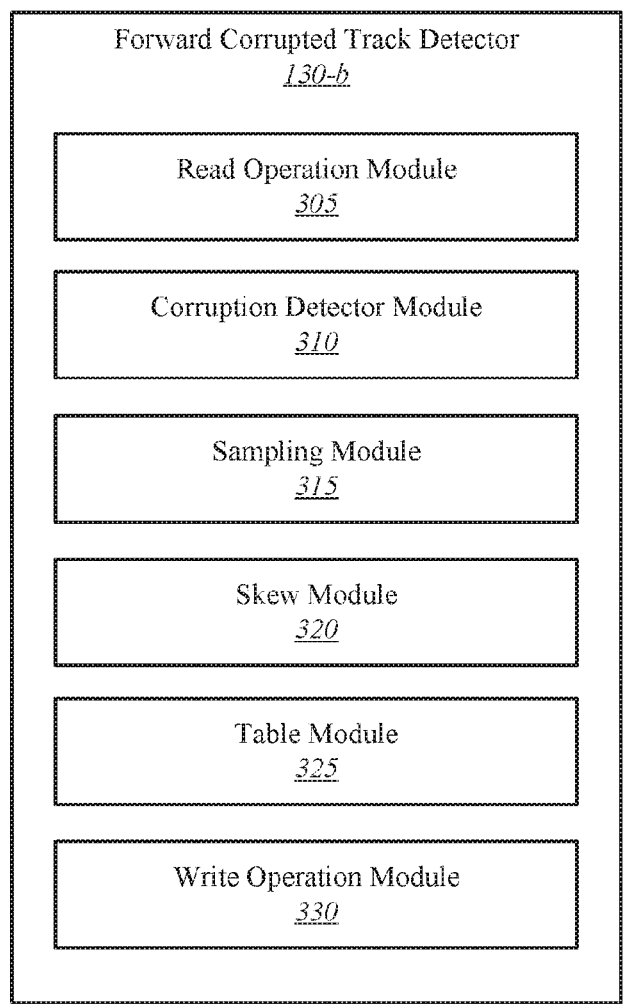
FIG. 3 shows a block diagram of one or more modules in accordance with various aspects of this disclosure.

FIG. 3 shows a block diagram 300 of a forward corrupted track detector 130-b. The forward corrupted track detector 130-b may include one or more processors, memory, and/or one or more storage devices. The forward corrupted track detector 130-b may include a read operation module 305, a corruption detector module 310, a sampling module 315, a skew module 320, a table module 325, and/or a write operation module 330. The forward corrupted track detector 130-b may be one example of forward corrupted track detector 130 of FIGS. 1 and/or 2. Each of these components may be in communication with each other.

In one embodiment, the read operation module 305 causes a read lead to perform a read operation for a target track of a drive, such as the drive media 225 of FIG. 2. The read operation module 305 may detect a read failure of the read operation for the target track. The read operation module 305 may provide information to the corruption detector module 310 which indicates that the read operation for the target track failed. The corruption detector module 310 may instruct the sampling module 315 to perform a boundary track read operation on one or more tracks, including and/or adjacent to the target track. The sampling module 315 may select one or more sectors to be read in order to determine if the one or more sectors is corrupted. In some examples, the sectors may be along the boundaries of one or more tracks. The sampling module 315 may cause the read operation module 305 to instruct a drive controller, such as the drive controller 210 of FIG. 2, to perform a read operation for the selected samples.

The corruption detector module 310 may detect an extent of a forward corruption area based on the outcomes of the boundary track read operations. The sampling module 315 may perform the boundary track read operation by sampling one or more sectors near the target track to identify an extent of the forward corruption area. Performing the boundary track read operation may further include the read operation module 305 performing a read operation for each of the one or more sectors near a failed sector of the target track where the read failure occurred. In further examples, performing the boundary track read operation may further include the read operation module 305 performing a read operation for one or more sectors in a next track with respect to the target track. The corruption detector module 310 may determine a status of the read operations for each of the one or more sectors. The statuses may be a failure, a success, or may be inconclusive. In some examples, the corruption detector module 310 may further identify the forward corruption area from a first sector of the one or more sectors having a read failure to a last sector of the one or more sectors having a read failure.

In some examples, the corruption detector module 310 may detect the read operation failure at a failed sector of the target track and determine a location of the failed sector within the target track. The sampling module 315 may select the one or more tracks on which the boundary read operation may be performed based at least in part on the location of the failed sector. For example, the sampling module 315 may select different sectors for sampling based on whether the failed sector of the target track is a first sector of the target track and/or whether the failed sector is within a track skew range. For example, if the failed sector of the target track is a first sector of the target track, the sampling module 315 selects the failed sector, a first sector of a next track, and a last sector of the target track where the forward corruption started. If the failed sector is within a track skew range, the sampling module 315 may select the same sectors as if the failed sector was the first sector of the target track, plus a sector of the next track at a same wedge of the failed sector, and a sector of the next track at a same wedge of the target track where the forward corruption started. If the failed sector is outside of the track skew range, the sampling module 315 may select the same sectors as if the failed sector was within the track skew range, plus a last sector of the next track.

In some examples, the read operation module 305 may retry the read operation at a failed sector in the target track where the read operation failed. This retry may serve as confirmation that the sector is bad. If the retried read operation at the failed sector fails again, the sampling module 315 may cause the read operation module 305 to perform a read operation on each of a first sector that is two sectors before the failed sector and a second sector that is two sectors after the failed sector.

In some examples, the corruption detector module 310 may identify one or more sectors of the forward corruption area as bad sectors. The corruption detector module 310 may prevent a read operation to each of the identified one or more bad sectors until a write operation has occurred for the identified one or more bad sectors.

When the corruption detector module 310 identifies one or more sectors of the forward corruption area as bad sectors (e.g., the sectors had a read failure), the table module 325 may store an indication in a table that identifies the one or more sectors of the forward corruption area as bad sectors. The table may list all the sectors that have had read failures which have not been corrected. The table may also include all the sectors, or possibly entire tracks, that are corrupted. In some examples, upon receiving a read command, the table module 325 may check the table to determine whether any sector included in the read command is listed as a bad sector. If the table module 325 determines that any sector included in a read command is listed as a bad sector, the read operation module 305 does not perform the read command. If the table module 325 determines that none of the sectors included in the read command is listed as a bad sector, the read operation module 305 performs the read command.

In some embodiments, the write operation module 330 may write to one or more or more sectors of the forward corruption area after the sectors are identified as bad sectors. The write operation module 330 may write zero data (e.g., any data not intended to be used, such as all 0s or all 1s, etc.) in the forward corrupted area. Rewriting the bad sectors may allow the drive media to function normally within the rewritten forward corrupted area. Read operations to those sectors may not degrade performance of the drive.

Figure 4:
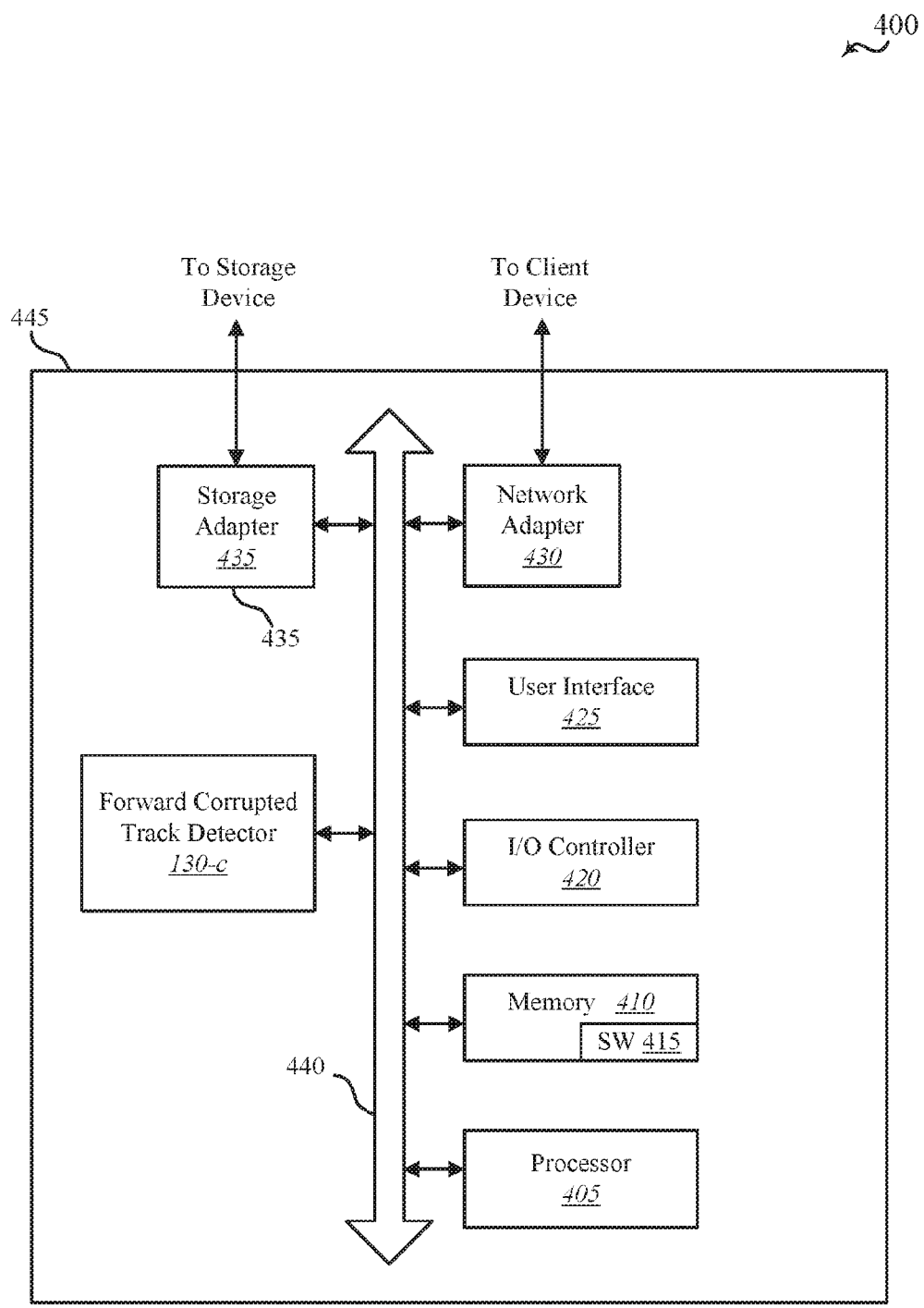
FIG. 4 shows a diagram of a system in accordance with various aspects of this disclosure.

FIG. 4 shows a system 400 for forward corrupted track detection and by-pass, in accordance with various examples. System 400 may include an apparatus 445, which may be an example of any one of device 105 of FIG. 1 and/or apparatus 205 of FIG. 2.

The apparatus 445 may include components for bi-directional voice and data communications including components for transmitting communications and components for receiving communications. For example, the apparatus 445 may communicate bi-directionally with one or more storage devices and/or client systems. This bi-directional communication may be direct (e.g., the apparatus 445 communicating directly with a storage system) and/or indirect (e.g., the apparatus 445 communicating indirectly with a client device through a server).

The apparatus 445 may also include a processor 405, and memory 410 (including software/firmware code (SW) 415), an input/output (I/O) controller 420, one or more user interfaces 425, a network adapter 430, and a storage adapter 435. The software/firmware code 415 may be one example of a software application executing on apparatus 445. The network adapter 430 may communicate bi-directionally— via one or more wired links and/or wireless links—with one or more networks and/or client devices. In some embodiments, the network adapter 430 may provide a direct connection to a client device via a direct network link to the Internet via a POP (point of presence). In some embodiments, the network adapter 430 of the apparatus 445 may provide a connection using wireless techniques, including digital cellular telephone connection, Cellular Digital Packet Data (CDPD) connection, digital satellite data connection, and/or another connection. The apparatus 445 may include a forward corrupted track detector 130-*c*, which may perform the functions described above for the forward corrupted track detector 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals, or any combination thereof. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including radio frequency identification (RFID) and ultra-wide band (UWB)), or any combination thereof.

One or more buses 440 may allow data communication between one or more elements of the apparatus 445 (e.g., the processor 405, the memory 410, the I/O controller 420, the user interface module 425, the network adapter 430, and the storage adapter 435, etc.).

The memory 410 may include random access memory (RAM), read only memory (ROM), flash RAM, SMR, and/or other types. The memory 410 may store computer-readable, computer-executable software/firmware code 415 including instructions that, when executed, cause the processor 405 to perform various functions described in this disclosure. Alternatively, the software/firmware code 415 may not be directly executable by the processor 405 but may cause a computer (e.g., when compiled and executed) to perform functions described herein. Alternatively, the computer-readable, computer-executable software/firmware code 415 may not be directly executable by the processor 405, but may be configured to cause a computer (e.g., when compiled and executed) to perform functions described herein. The processor 405 may include an intelligent hardware device, e.g., a central processing unit (CPU), a microcontroller, an application-specific integrated circuit (ASIC), etc., or any combination thereof.

In some embodiments, the memory 410 may contain, among other things, the Basic Input-Output system (BIOS) which may control basic hardware and/or software operation such as the interaction with peripheral components or devices. For example, at least a portion of the forward corrupted track detector 130-c may be stored within the system memory 410. Applications resident with the system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., the network adapter 430, etc.).

Many other devices and/or subsystems may be connected to one or may be included as one or more elements of the system 400 (e.g., personal computing device, mobile computing device, smart phone, server, internet-connected device, cell radio module, etc.). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of the system memory 410 or other memory. The operating system provided on the I/O controller 420 may be a mobile device operation system, a desktop/laptop operating system, or another known operating system.

The I/O controller 420 may operate in conjunction with the network adapter 430 and/or the storage adapter 435. The network adapter 430 may enable apparatus 445 with the ability to communicate with client devices (e.g., the device 105 of FIG. 1), and/or other devices over a network. The Network adapter 430 may provide wired and/or wireless network connections. In some cases, the network adapter 430 may include an Ethernet adapter or Fibre Channel adapter. The Storage adapter 435 may enable the apparatus 445 to access one or more data storage devices (e.g., the storage device 110). The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter, or any combination thereof.

FIGS. 5A-5D shows example tracks illustrating forward corrupted areas, in accordance with various examples. At least one aspect of the tracks may be implemented in conjunction with the device 105 of FIG. 1, the apparatus 205 of FIG. 2, and/or the forward corrupted track detector 130 depicted in FIGS. 1, 2, 3, and/or 4.

Figure 5A:
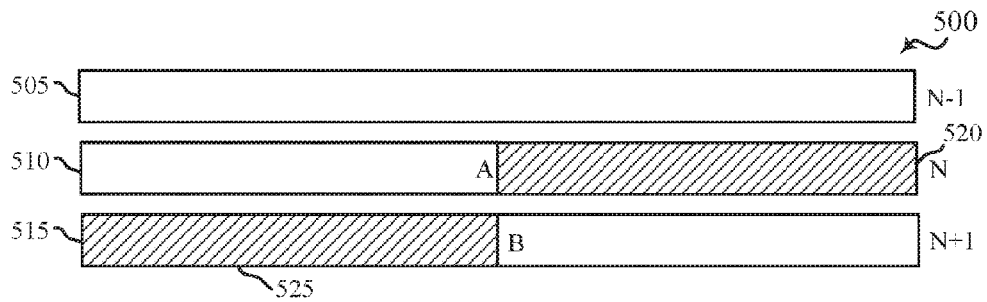
FIGS. 5A-5D show examples of a forward corruption area in accordance with various aspects of this disclosure.

FIG. 5A shows an example of a forward corruption area 520 and 525 in accordance with various aspects of this disclosure. FIG. 5A shows a portion of a drive 500 which includes a track N−1 505, a track N 510, and a track N+1 515. The track N 510 is a target track and the tracks N−1 505 and N+1 515 are adjacent to the track N 510. In the example of FIG. 5A, track skew is not considered. Track skew is a rotational offset from a previous sector on one track to a first sector of the next track. Track skew boundary is an edge of sectors where track skew affects the sectors.

If a write operation to track N 510 is interrupted (e.g., power is lost) at sector A, the shaded regions 520 and 525 may become corrupted. This is because the write operation never got to finish rewriting the target track and the tracks that were overlapped by track N 510, which is track N+1 515 in this example. Thus, the forward corruption area includes shaded regions 520 and 525. Without a mechanism to store the location of the write operation before or at the failure, the forward corruption area 520 and 525 cannot be detected in advance of a read operation to a sector within the region 520 and 525. Using techniques described herein, the forward corruption area 520 and 525 can be identified.

A few sectors near sector A may be checked with a read operation to determine if the sectors are bad. A sector may be determined to be corrupted or bad if a read operation to that sector fails. For example, two to four sectors near sector A may be checked. In other examples, other numbers of sectors may be checked. Sector B and nearby sectors may also be checked. Sector B is the sector directly below (from the shingled perspective) sector A in the track N+1 515.

Expected read operation values may be determined for the sample sectors for each type of corruption case. These expected values can be used to identify the forward corruption area 520 and 525. In this example, if sector A has a read failure and sectors near B have read failures (sectors before B) and then read successes (sectors after B), the forward corruption area 520 and 525 is from sector A until the last read fail sector of B. In some examples, additional sectors between A and B may be sampled and checked to ensure the forward corruption area 520 and 525 is properly identified.

Figure 5B:
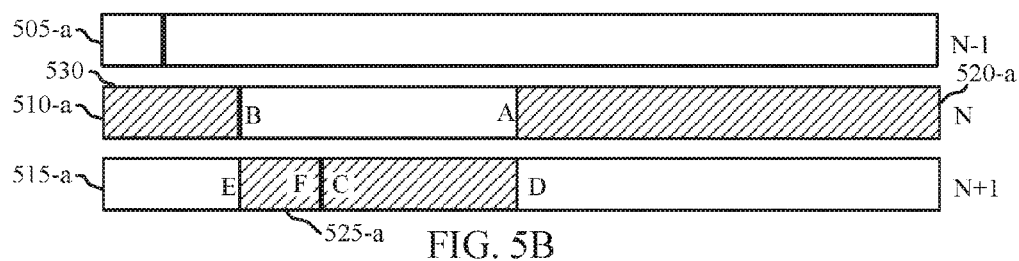

FIG. 5B shows an example of a forward corruption area in accordance with various aspects of this disclosure. FIG. 5B shows a portion of a drive 500-a which includes a track N−1 505-a, a track N 510-a, and a track N+1 515-a. The track N 510-a is a target track and the tracks N−1 505-a and N+1 515-a are adjacent to the track N 510-a. The tracks 505-a, 510-a, and 515-a may be examples of one or more aspects of the tracks 505, 510, and 515 of FIG. 5A. In the example of FIG. 5B, track skew is considered. Track skew may be present in the drive 500-a to reduce seek time for the read and write heads.

If a write operation to track N 510-a is interrupted (e.g., power is lost or the device fails in some other way) at sector A, the shaded regions 520-a, 525-a, and 530 may become corrupted. Thus, the forward corruption area includes shaded regions 520-a, 525-a, and 530. Sectors that may be checked for corruption may include, for example, the sector where the forward corruption started (A), the last sector of track N 510-*a* (B), the first sector of track N+1 515-*a* which is the next track where the forward corruption started (C), the sectors of track N+1 515-*a* at the same wedge of sector A (D), the sectors of track N+1 515-*a* at the same wedge of the sector B which is the last sector of track N 520-*a* where the forward corruption started (E), and the last sector of track N+1 515-*a* (F). In some examples, at least two consecutive sectors from the forward corruption boundary near D may be checked. In some examples, at least two consecutive sectors from the track skew boundary near E may be checked.

Based on the location of the first read fail (the last writing before power-off at sector A), the forward track corruption with track skew can be categorized into multiple types. For example, the forward track corruption may be categorized into three types of corruption. Three possible categories may include a normal case, within a track skew range case, and a full track case. Forward track corruption can be determined by comparing the retry results at each position with expected values based on the type of forward corruption. For each type, the sample sectors, the expected values, and the area to be determined as forward corrupted when the expected values are satisfied is defined.

For the normal case when the read fail occurred outside of the track skew range, illustrated in FIG. 5B, sample sectors and expected values are as follows. Sectors A-C and those nearby should have read failures. The read failures may be for one or more sectors near the identified sectors. Sector D and those nearby should have a read failure and then a success. Sector E and those nearby should have read successes and then read failures. Sector F and those nearby should have read failures. Based on these statuses, the forward corrupted area should be from sector A to the last read fail sector of D and from the first read fail sector of E to the first read success of sector F.

Figure 5C:
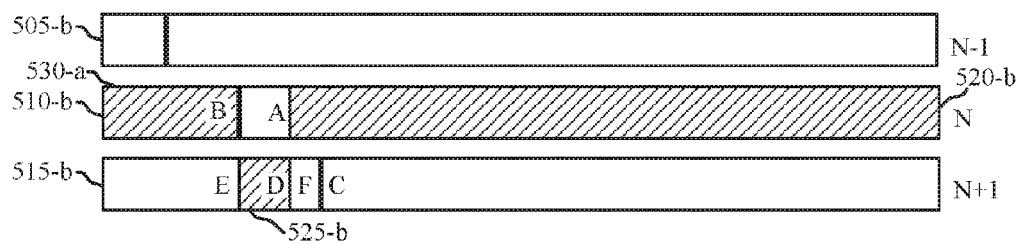

FIG. 5C shows an example of a forward corruption area in accordance with various aspects of this disclosure. FIG. 5C shows a portion of a drive 500-*b* which includes a track N−1 505-*b*, a track N 510-*b*, and a track N+1 515-*b*. The track N 510-*b* is a target track and the tracks N−1 505-*b* and N+1 515-*b* are adjacent to the track N 510-*b*. The tracks 505-*b*, 510-*b*, and 515-*b* may be examples of one or more aspects of the tracks 505, 510, and 515 of FIGS. 5A and/or 5B. In the example of FIG. 5C, track skew is considered.

The example of FIG. 5C illustrates an example when the corruption occurs within the track skew range. Sectors near A and B should have read failures. The read failures may be for one or more sectors near the identified sectors. Sectors near C should have read successes. Sectors near D should have read failures and then read successes. Sector E should have read successes and then read failures. Based on these statuses, the forward corrupted area should be from the beginning of the track N 510-*b* to sector B, from sector A to the end of the track N 510-*b*, and from the first read fail sector of E to the first read success of sector D. Thus, the forward corrupted areas are 520-*b*, 525-*b*, and 530-*a*.

Figure 5D:
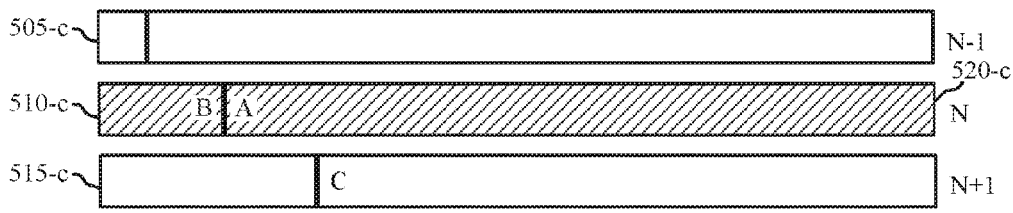

FIG. 5D shows an example of a forward corruption area in accordance with various aspects of this disclosure. FIG. 5D shows a portion of a drive 500-*c* which includes a track N−1 505-*c*, a track N 510-*c*, and a track N+1 515-*c*. The track N 510-*c* is a target track and the tracks N−1 505-*c* and N+1 515-*c* are adjacent to the track N 510-*c*. The tracks 505-*c*, 510-*c*, and 515-*c* may be examples of one or more aspects of the tracks 505, 510, and 515 of FIGS. 5A-5C. In the example of FIG. 5D, track skew is considered.

The example of FIG. 5D illustrates an example when the corruption occurs at the first sector of a track. Here, the failure occurred at sector A, the first sector of track N 510-*c*. Sectors A and B should have had read failures. The read failures may be for one or more sectors near the identified sectors. Sectors near C should have read successes. Based on these statuses, the forward corrupted area should be from sector A to sector B on track N 510-*c*. Thus, the forward corrupted areas includes 520-*c*.

Figure 6:
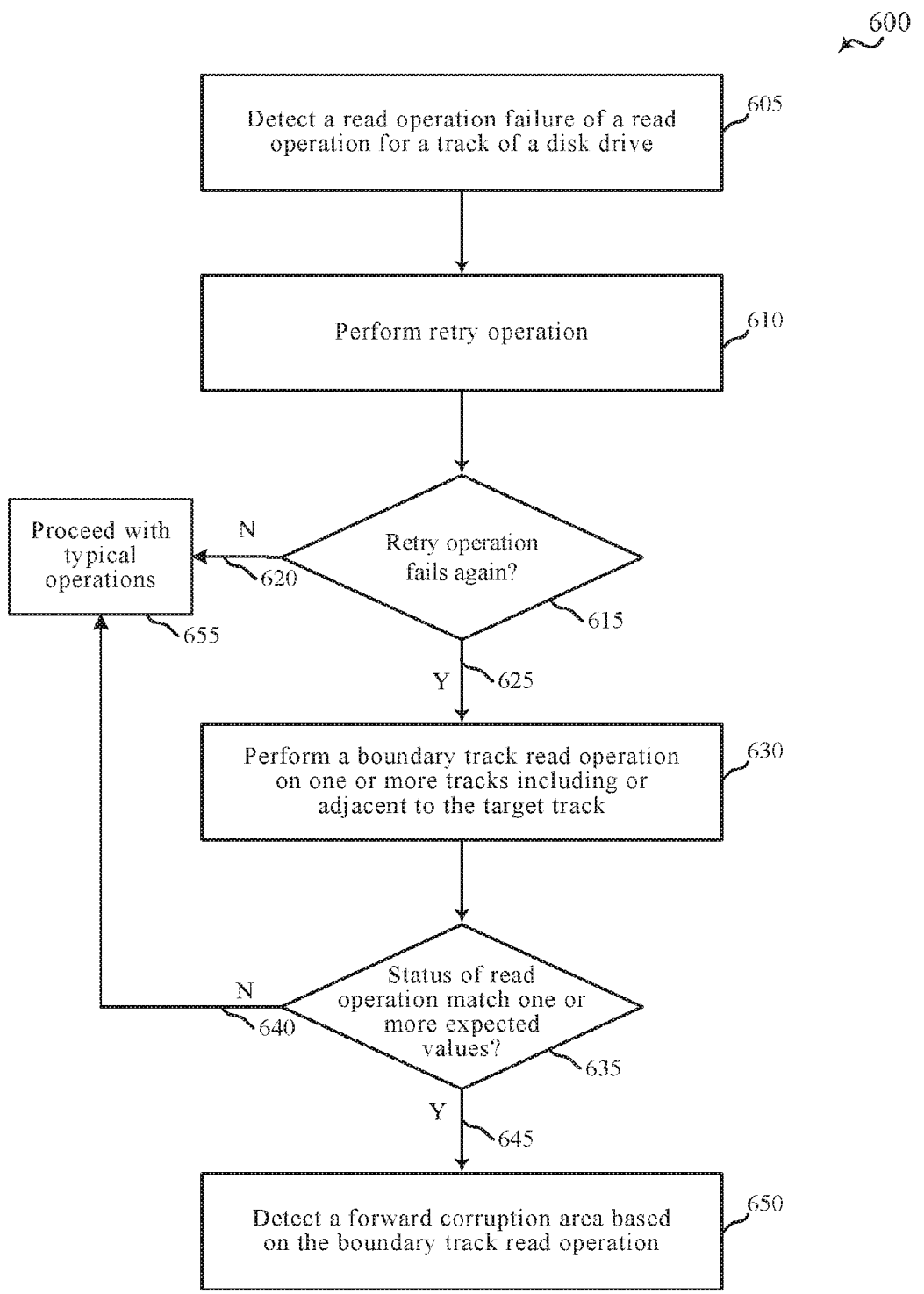
FIG. 6 is a flow chart illustrating an example of a method in accordance with various aspects of this disclosure.

FIG. 6 is a flow chart illustrating an example of a method 600 for forward corrupted track detection and by-pass, in accordance with various aspects of the present disclosure. One or more aspects of the method 600 may be implemented in conjunction with the device 105 of FIG. 1, apparatus 205 of FIG. 2, and/or the forward corrupted track detector 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include detecting a read operation failure of a read operation for a track of a disk drive. In some embodiments, detecting the read operation failure of the read operation for the target track further includes detecting the read operation failure at a failed sector of the target track. The method 600 may also include determining a location of the failed sector within the target track.

The method 600 may also include selecting the one or more tracks to perform the boundary read operation based at least in part on the location of the failed sector within the target track. In some examples, selecting the one or more tracks further includes selecting different sectors based on the location of the failed sector of the target track and whether it is within or without the skew range. Within a track skew range may mean those sectors that are affected by track skew. If the failed sector of the target track is a first sector of the target track, the method 600 further includes selecting the failed sector, a first sector of a next track, and a last sector of the target track where the forward corruption started. If the failed sector is within a track skew range, the method 600 further includes selecting the same sectors as if the failed sector was the first sector of the target track, plus a sector of the next track at a same wedge of the failed sector, and a sector of the next track at a same wedge of the target track where the forward corruption started. If the failed sector is outside of the track skew range, the method 600 further includes selecting the same sectors as if the failed sector was within the track skew range, plus a last sector of the next track. In other examples, other sectors may be selected or added to the selected tracks.

At block 610, the method 600 may perform a retry of the read operation. At block 615, if the retry operation succeeds this time, the method 600 proceeds along path 620 to block 655. At block 655, the method 600 proceeds with typical operations of the drive after a successful read operation. At block 615, if the retry operation fails again, the method 600 proceeds along path 625 to block 630. At block 630, the method 600 may include performing a boundary track read operation on one or more tracks including or adjacent to the target track.

At block 635, the status of the boundary track read operation is determined to match one or more expected values (e.g., read fails or read successes). In one example, if the statuses of the boundary track read operations do not match any of the expected values, the method 600 may proceed along path 640 to block 655, where typical drive operations are performed. If the statuses of the boundary track read operations do match the expected values, the method 600 may proceed along path 645 to block 650.

At block 650, the method 600 may further include detecting a forward corruption area based on the boundary track read operation. In some examples, detecting the forward corruption area based on the boundary track read operation further includes sampling one or more sectors near the target track to identify an extent of the forward corruption area. In some examples, sampling one or more sectors near the target track further includes sampling one or more sectors near an area of the target track where the read failure occurred and sampling one or more sectors in a next track of the target track.

In some examples, sampling one or more sectors near the target track further includes performing a read operation for each of the one or more sectors and determining a status of the read operation for each of the one or more sectors. In some examples, detecting the forward corruption area based on the boundary track read operation further includes identifying the forward corruption area from a first sector of the one or more sectors having a read failure to a last sector of the one or more sectors having a read failure.

The method 600 may also include retrying the read operation at a failed sector in the target track where the read operation failed. If the retried read operation at the failed sector fails again, the method 600 may include performing a read operation on each of a second sector two sectors before the failed sector and a third sector two sectors after the failed sector. In other examples, other sectors may be selected.

The method 600 may further include identifying one or more sectors of the forward corruption area as bad sectors and preventing a read operation to each of the identified one or more bad sectors until a write operation has occurred for the identified one or more bad sectors. In other examples, the method 600 includes writing to the one or more sectors of the forward corruption area.

The operation(s) at block 605-615 may be performed using the forward corrupted track detector 130 described with reference to FIGS. 1-4 and/or another module. Thus, the method 600 may provide for forward corrupted track detection and by-pass relating to SMR drives. It should be noted that the method 600 is just one implementation and that the operations of the method 600 may be rearranged, omitted, and/or otherwise modified such that other implementations are possible and contemplated.

Figure 7:
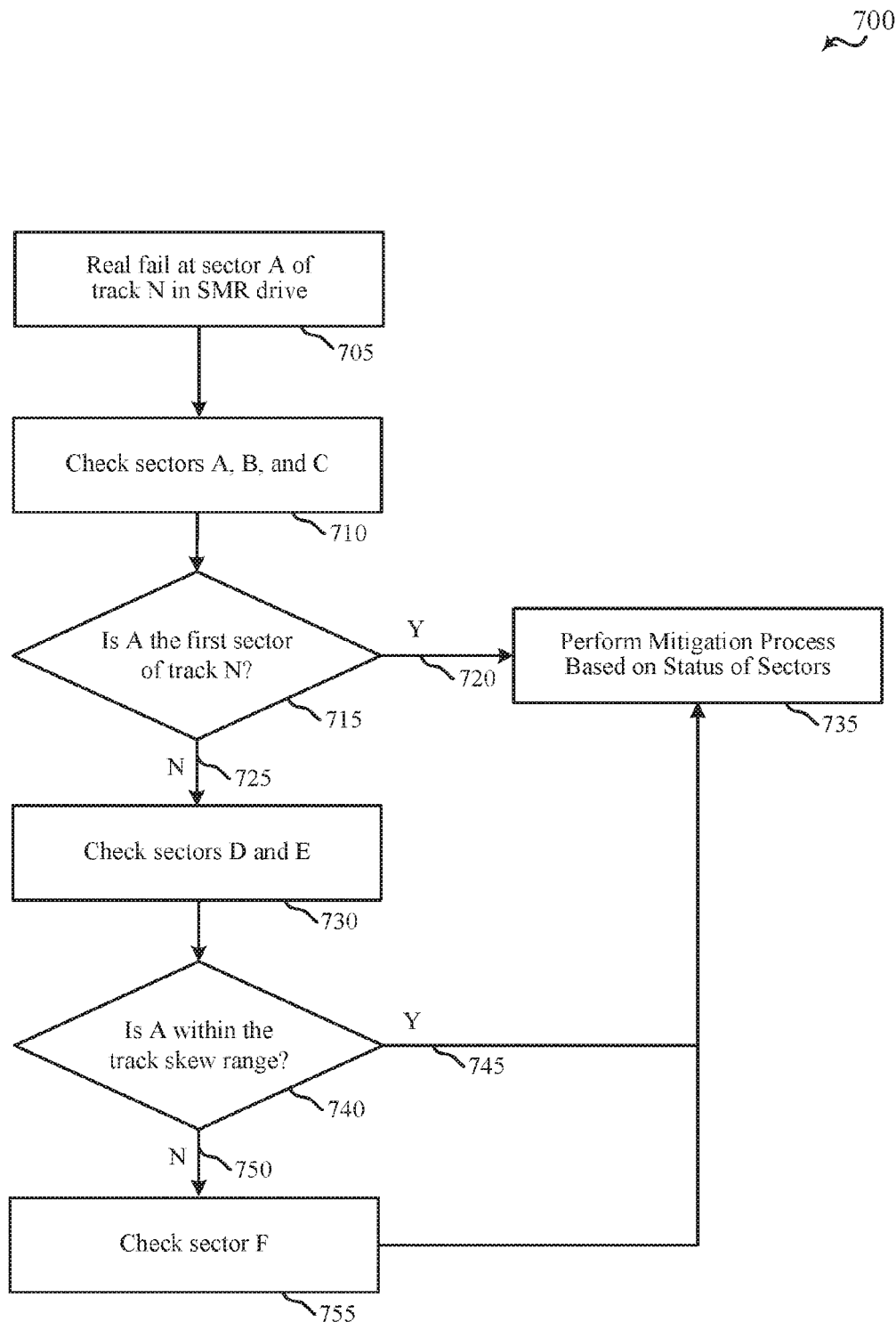
FIG. 7 is a flow chart illustrating an example of a method in accordance with various aspects of this disclosure.

FIG. 7 is a flow chart illustrating an example of a method 700 for forward corrupted track detection and by-pass, in accordance with various aspects of the present disclosure. One or more aspects of the method 700 may be implemented in conjunction with the device 105 of FIG. 1, the apparatus 205 of FIG. 2, and/or the forward corrupted track detector 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, the method 700 may include detecting a read failure at a sector A of a target track ("track N") in an SMR drive. Once a read failure is detected, the techniques described herein may be applied to determine whether the read failure is due to a forward corruption track, and if so, to determine the extent of the forward corruption area. At block 710, the method 700 includes checking sectors A, B, and C. The sectors described herein may be similar to any of the sectors shown in the example of FIGS. 5A-5D. Checking a sector entails performing read operations at the sector and determining if the read operation was successful or failed. The method 700 may include recording which sectors were checked, their locations with respect to the failed sector of the target track, and the outcomes of the read operations.

At block 715, the method 700 includes determining whether sector A is a first sector of the target track. If so, the method 700 proceeds along path 720 to block 735. At block 735, the method 700 includes performing a mitigation process based on the read operation status of the sectors. This example may be similar to the example described in FIG. 5D.

At block 715, if the method 700 determines that sector A is not the first sector of the target track, the method 700 proceeds along path 725 to block 730. At block 730, the method 700 performs a read operation check on sectors D and E. At block 740, the method 700 determines if sector A is within the track skew range. If it is, the method 700 proceeds along path 745 to block 735, where the mitigation process is performed based on the status of the sectors. This example may be similar to the example described in FIG. 5C.

If sector A is not within the track skew range, the method 700 proceeds along path 750 to block 755. At block 755, the method 700 performs a read operation check on sector F. The method 700 then proceeds to block 735 to perform the mitigation process based on the status of the sectors. This example may be similar to the example described in FIG. 5B. The mitigation process may include identifying, in a table for example, an extent of the forward corruption area or a list of bad sectors. In another example, the mitigation process may include writing to the bad sectors.

The operations at blocks 705-755 may be performed using the forward corrupted track detector 130 described with reference to FIGS. 1, 2, 3, and/or 4 and/or another module. Thus, the method 700 may provide for forward corrupted track detection and by-pass relating to forward corrupted track detection and by-pass. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, and/or other optical disk storage, magnetic disk storage or other magnetic storage devices, or any other medium that can be used to carry or store desired program code means in the form of instructions or data structures and that can be accessed by a general-purpose or special-purpose computer, and/or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, and/or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, and/or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising a storage controller to:
   perform a read operation for a target track of a shingled magnetic recording (SMR) disk drive;
   detect a read operation failure of the read operation for the target track;
   perform a boundary track read operation on one or more tracks including or adjacent to the target track; and
   detect a forward corruption area and identify an extent of the forward corruption area based at least in part on the boundary track read operation.

2. The storage system of claim 1, the storage controller further to perform the boundary track read operation by sampling one or more sectors relative to the target track to identify the extent of the forward corruption area.

3. The storage system of claim 2, the storage controller further to:
   perform a read operation for each of the one or more sectors relative to a failed sector of the target track where the read failure occurred;
   perform a read operation for one or more sectors in a next track with respect to the target track; and
   determine a status of the read operations for each of the one or more sectors.

4. The storage system of claim 3, the storage controller further to:
   identify the forward corruption area from a first sector of the one or more sectors having a read failure to a last sector of the one or more sectors having a read failure.

5. The storage system of claim 1, the storage controller further to:
   detect the read operation failure at a failed sector of the target track;
   determine a location of the failed sector within the target track; and
   select the one or more tracks to perform the boundary read operation based at least in part on the location of the failed sector.

6. The storage system of claim 1, the storage controller further to:
   retry the read operation at a failed sector in the target track where the read operation failed; and
   if the retried read operation at the failed sector fails again, perform a read operation on each of a first sector two sectors before the failed sector and a second sector two sectors after the failed sector.

7. The storage system of claim 1, the storage controller further to:
   identify one or more sectors of the forward corruption area as bad sectors; and
store an indication in a table that identifies the one or more sectors of the forward corruption area as bad sectors.

8. The storage system of claim 7, the storage controller, upon receiving a read command, further to:
   check the table to determine whether any sector included in the read command is listed as a bad sector;
   if any sector included in the read command is listed as a bad sector, do not perform the read command; and
   if no sector included in the read command is listed as a bad sector, perform the read command.

9. An apparatus comprising:
   a storage drive configured for incorporation into a data center or data cloud environment; and
   a controller to:
      detect a read operation failure of a read operation for a target track of the storage drive;
      perform a boundary track read operation on one or more tracks including or adjacent to the target track; and
      detect a forward corruption area and identify an extent of the forward corruption area based at least in part on the boundary track read operation.

10. The apparatus of claim 9, the controller further to:
    select one or more sectors of the one or more tracks adjacent to the target track based on a location of a sector associated with the read operation failure for the target track;
    perform the boundary track read operation by performing a read operation on the selected one or more sectors to identify the extent of the forward corruption area;
    determine a status of the read operation for each of the selected one or more sectors;
    determine the extent of the forward corruption area based on the status of the read operation for each of the one or more sectors; and
    identify each sector in the forward corruption area as a bad sector in a database.

11. A method comprising:
    detecting a read operation failure of a read operation for a track of a disk drive;
    performing a boundary track read operation on one or more tracks including or adjacent to the target track; and
    detecting a forward corruption area and identifying an extent of the forward corruption area based at least in part on the boundary track read operation.

12. The method of claim 11, the detecting the forward corruption area based on the boundary track read operation further comprises:
    sampling one or more sectors relative to the target track to identify the extent of the forward corruption area.

13. The method of claim 12, the sampling one or more sectors relative to the target track further comprises:
    sampling one or more sectors relative to an area of the target track where the read failure occurred; and
    sampling one or more sectors in a next track of the target track.

14. The method of claim 12, the sampling one or more sectors relative to the target track further comprises:
    performing a read operation for each of the one or more sectors; and
    determining a status of the read operation for each of the one or more sectors.

15. The method of claim 14, the detecting the forward corruption area based on the boundary track read operation further comprises:
    identifying the forward corruption area from a first sector of the one or more sectors having a read failure to a last sector of the one or more sectors having a read failure.

16. The method of claim 11, further comprising:
    the detecting the read operation failure of the read operation for the target track further comprises detecting the read operation failure at a failed sector of the target track;
    determining a location of the failed sector within the target track; and selecting the one or more tracks to perform the boundary read operation based at least in part on the location of the failed sector within the target track.

17. The method of claim 16, the selecting the one or more tracks further comprises:
   if the failed sector of the target track is a first sector of the target track, selecting the failed sector, a first sector of a next track, and a last sector of the target track where the forward corruption started;
   if the failed sector is within a track skew range, selecting the same sectors as if the failed sector was the first sector of the target track, plus a sector of the next track at a same wedge of the failed sector, and a sector of the next track at a same wedge of the target track where the forward corruption started; and
   if the failed sector is outside of the track skew range, selecting the same sectors as if the failed sector was within the track skew range, plus a last sector of the next track.

18. The method of claim 11, further comprising:
   retrying the read operation at a failed sector in the target track where the read operation failed; and
   if the retried read operation at the failed sector fails again, performing a read operation on each of a second sector two sectors before the failed sector and a third sector two sectors after the failed sector.

19. The method of claim 11, further comprising:
   identifying one or more sectors of the forward corruption area as bad sectors; and
   preventing a read operation to each of the identified one or more bad sectors until a write operation has occurred for the identified one or more bad sectors.

20. The method of claim 11, further comprising:
   writing to the one or more sectors of the forward corruption area.

* * * * *